United States Patent
Nguyen et al.

(10) Patent No.: US 10,423,636 B2
(45) Date of Patent: Sep. 24, 2019

(54) RELATING COLLECTIONS IN AN ITEM UNIVERSE

(71) Applicant: Abebooks, Inc., Victoria (CA)

(72) Inventors: Duc Tung Nguyen, Victoria (CA); Adam Blair Kelly, Victoria (CA); Timothy Peter Munro, Victoria (CA); Thomas Nicol, Victoria (CA); Andrew Norimasa Nishigaya, Victoria (CA); Noel O'Brien, Victoria (CA)

(73) Assignee: Amazon Technologies, Inc., Seattle, WA (US)

(*) Notice: Subject to any disclaimer, the term of this patent is extended or adjusted under 35 U.S.C. 154(b) by 352 days.

(21) Appl. No.: 15/191,489

(22) Filed: Jun. 23, 2016

(65) Prior Publication Data
US 2017/0371935 A1    Dec. 28, 2017

(51) Int. Cl.
| | |
|---|---|
| *G06F 16/248* | (2019.01) |
| *G06F 16/28* | (2019.01) |
| *G06F 16/2458* | (2019.01) |
| *G06F 3/0482* | (2013.01) |
| *G06Q 30/02* | (2012.01) |

(52) U.S. Cl.
CPC .......... *G06F 16/248* (2019.01); *G06F 3/0482* (2013.01); *G06F 16/2468* (2019.01); *G06F 16/287* (2019.01); *G06Q 30/02* (2013.01)

(58) Field of Classification Search
None
See application file for complete search history.

(56) References Cited

U.S. PATENT DOCUMENTS

| | | | | |
|---|---|---|---|---|
| 6,363,377 | B1 * | 3/2002 | Kravets | G06F 16/951 |
| 8,843,427 | B1 * | 9/2014 | Lin | G06N 99/005 |
| | | | | 705/16 |
| 8,868,554 | B1 * | 10/2014 | Acton | G06F 17/30663 |
| | | | | 705/26.1 |
| 9,230,012 | B2 * | 1/2016 | Assadollahi | G06F 16/3323 |
| 9,705,884 | B2 * | 7/2017 | Abuelsaad | H04L 63/104 |
| 2007/0288602 | A1 * | 12/2007 | Sundaresan | G06Q 30/06 |
| | | | | 709/219 |
| 2009/0265426 | A1 | 10/2009 | Svendsen et al. | |
| 2010/0141788 | A1 * | 6/2010 | Hwang | G06K 9/228 |
| | | | | 348/222.1 |
| 2010/0228714 | A1 | 9/2010 | Carroll | |
| 2012/0109966 | A1 * | 5/2012 | Liang | G06F 17/30873 |
| | | | | 707/740 |
| 2013/0173639 | A1 | 7/2013 | Chandra et al. | |
| 2013/0262114 | A1 * | 10/2013 | Brockett | G10L 15/22 |
| | | | | 704/243 |
| 2013/0318063 | A1 | 11/2013 | Ayzenshtat et al. | |

(Continued)

OTHER PUBLICATIONS

International Search Report and Written Opinion for PCT/CA2017/050739 dated Sep. 18, 2017.

*Primary Examiner* — Richard L Bowen
(74) *Attorney, Agent, or Firm* — Thomas | Horstemeyer, LLP

(57) ABSTRACT

Disclosed are various embodiments for identifying related collections of items within an item universe. Related collections of items can be identified based upon title similarity or a degree of overlap between collections of items. Additionally, relationships between collections of items can be generated if the collections have identical or nearly identical collection titles.

20 Claims, 9 Drawing Sheets

(56) References Cited

U.S. PATENT DOCUMENTS

| | | | |
|---|---|---|---|
| 2014/0236951 A1* | 8/2014 | Taycher | G06F 16/93 707/738 |
| 2014/0282192 A1* | 9/2014 | Grossman | G06F 16/285 715/771 |
| 2015/0067476 A1 | 3/2015 | Song et al. | |
| 2015/0149329 A1 | 5/2015 | Tam et al. | |
| 2015/0331942 A1* | 11/2015 | Tan | G06F 17/30784 386/241 |

* cited by examiner

RELATING COLLECTIONS IN AN ITEM UNIVERSE

BACKGROUND

Items within an item universe, such as a product catalog, an item repository, a corpus of search results, a search index, or any other form of item repository, can be associated with one another. In a multi-user environment, different users can create curated collections of items from the item universe. These individualized collections can be a catalog, a saved list, a favorites list, or any other curated list or collection of items. As the number of curating users or collections grow, users who are searching for or browsing for collections of items from the item universe may have difficulty locating items or related collections.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present application is directed to identifying collections of items within an item universe. In the context of this disclosure, an item universe can represent a product catalog, electronic or digital goods, such as books, games and applications, a collection of search results accessible by a search engine, photos, musical albums, songs, videos, or any other digital item repository that may have metadata associated with the items. In the case of a multi-seller electronic marketplace, the various participating sellers may have product catalogs that offer various items. For example, a first seller might be a rare book dealer in Los Angeles who offers various rare books on various topics for sale through the marketplace. This seller can assemble or create curated collections or lists of items that he or she offers for sale. The curated collection can be given a title or other types of metadata.

A second seller might be another bookdealer in Portland that offers foreign language texts for sale. The second seller might also create curated collections of items that sort his or her offerings by topic or title. There might be tens or hundreds or other sellers in the marketplace that also create curated collections of their offerings and assign their respective collections a title or other metadata. Users browsing or searching within such a marketplace may have difficulty locating collections or items that might be related to one another. Embodiments of this disclosure can identify related collections of items that are curated by different users within a system by analyzing a degree of item overlap as well as a degree of title similarity. User interfaces can also be generated that allow users to browse related collections of items that are identified.

Figure 1A:
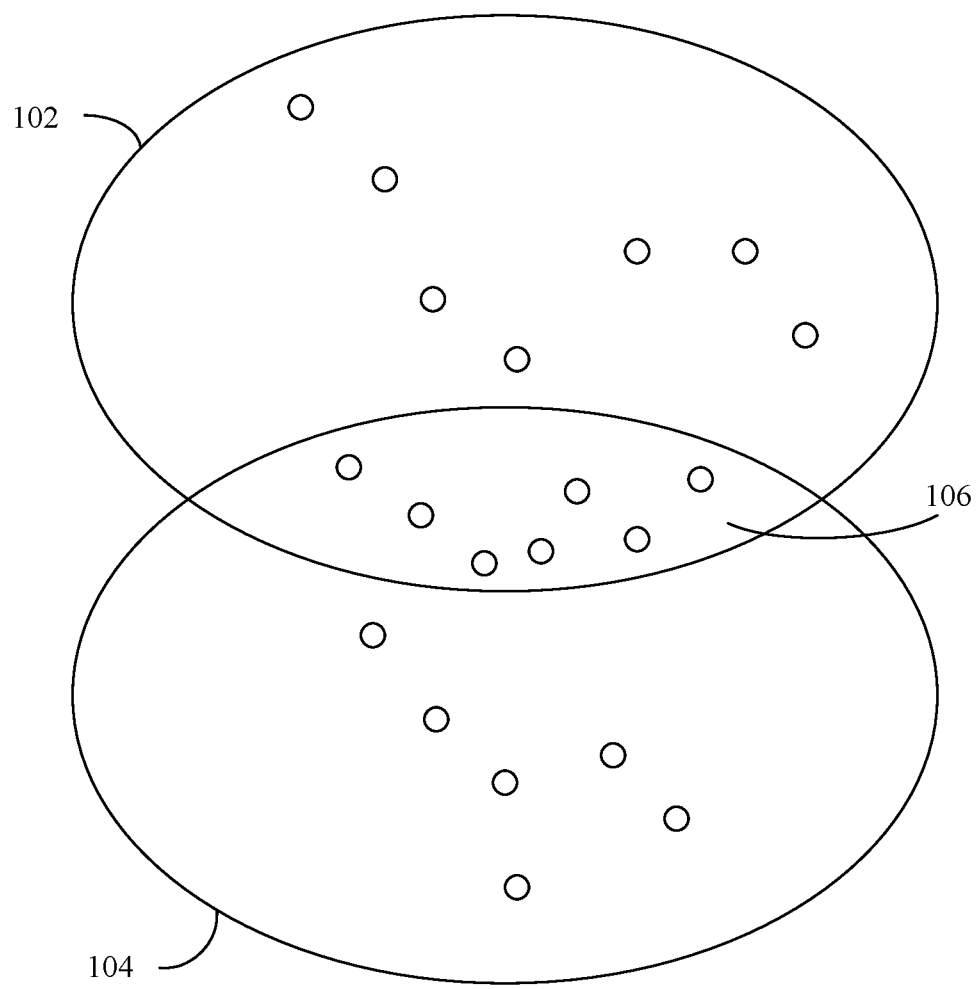
FIG. 1A is a Venn diagram illustrating overlap between collections of items.

Turning now to FIG. 1A, shown is a Venn diagram that represents two separate collections of items, 102 and 104, within an item universe. As noted above, the collections of items can represent items that are offered for sale through an electronic marketplace. For example, books can be offered for sale and can also be identified by an International Standard Book Number (ISBN), a listing identifier, or any other identifier can uniquely identify an item within an item universe. Accordingly, a particular item, such as a book, can exist in more than one collection of items. In other words, collections 102 and 104 may have some degree of item overlap. In the Venn diagram of FIG. 1A, the item overlap is identified by reference numeral 106. The item overlap 106 of FIG. 1A represents items that exist in both collections 102 and 104. Accordingly, embodiments of the disclosure can identify the two collections 102 and 104 as related to one another if the item overlap 106 meets an overlap threshold.

The overlap threshold can be determined and expressed in various ways. In one example, the overlap threshold can represent a minimum number of items. In another example, the overlap threshold can represent a minimum percentage of items from a collection that overlap with another collection relative to a total number of items in the collection. In yet another example, the overlap threshold can represent a Jaccard index or Jaccard similarity coefficient of a collection relative to another collection. The Jaccard index of two sets or collections is a statistical measure representing a similarity between the two collections. Therefore, in one example, the item overlap threshold can be a minimum Jaccard index that describes the similarity of one collection with respect to another collection. If the item overlap 106 between the two collections 102 and 104 meets the overlap threshold, the two collections 102 and 104 can be identified as related to one another within an item universe.

Figure 1B:
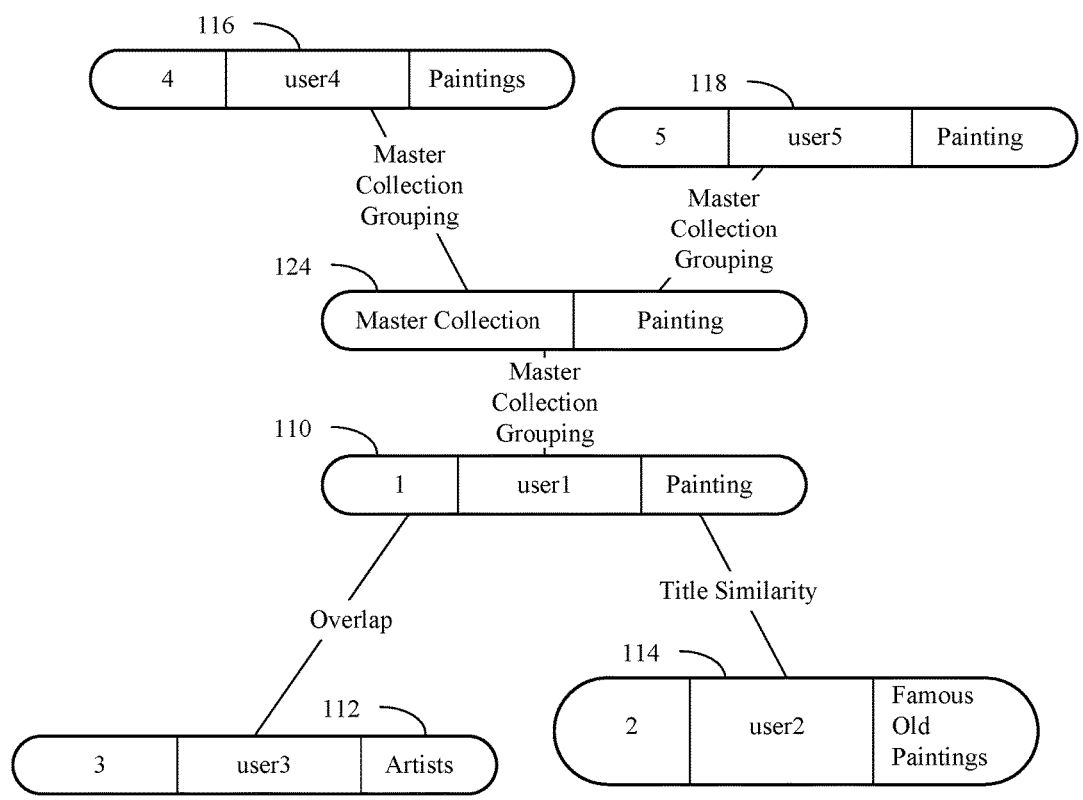
FIG. 1B is drawing illustrating relationships between collections of items.

Reference is now made to FIG. 1B, which illustrates a relationship between various collections within an item universe. As described with respect to FIG. 1A, two collections can be identified as related to one another based upon a degree of item overlap between the collections. Additionally, collections can also be identified as related to one another based upon a similarity of metadata associated with the respective collections. In the example of FIG. 1B, collections can also be identified as related to one another if a title assigned by a curating user is similar to the title of another collection. Additionally, if the titles of collections are identical or nearly identical, the collections having identical titles can be grouped together into a master collection that is assigned the same title or the nearly same title as the collections that are grouped together.

Accordingly, as depicted in FIG. 1B, collection 110 is associated with a particular collection identifier that uniquely identifies the collection with respect to the various collections in an item universe. The collection identifier for illustrative purposes in FIG. 1B is '1.' Embodiments of the disclosure can identify collection 110 as similar to collection 112 based upon a degree of overlap between the items within the respective collections. For example, if the items within the collections are books offered by booksellers, the overlap can be based upon a number of items in the respective collections 110 and 112 that have the same ISBN or other unique item identifier, such as a stock-keeping unit (SKU) number. Accordingly, a relationship between collections 110 and 112 can be established within the item universe.

Collections 110 and 114 are also identified as related to one another based upon a similarity between the titles assigned to the collections. Accordingly, a fuzzy string matching algorithm that identifies similar strings can be employed to determine whether the title assigned to collection 110 is similar to the title assigned to collection 114. The fuzzy string matching algorithm can be tuned to select the titles of collections 110 and 114 as similar to one another based upon the presence of a common word within the titles. Accordingly, the collections 110 and 114 can also be related together within the item universe.

Continuing the example of FIG. 1B, collections 110, 116, and 118 can also be identified as having an identical or nearly identical title. The identical or nearly identical title is in contrast to a merely similar title that exists between collections 110 and 114. Accordingly, the collections 110, 116, and 118 can be related together by joining them into a master collection grouping, or master collection 124. The master collection 124 can include a reference to the collections 110, 116, and 118 or a reference to the respective items identified by the collections with deduplication to remove duplicated references to the same items. The respective items within the master collection 124 can also include a reference to the users that curated the respective collections 110, 116, and 118.

By relating various collections curated by various users within an item universe together in this way, browsing of the collections through user interfaces by users or customers can be facilitated by improving the recognition of related collections. Embodiments of the disclosure can provide solutions to the technical challenge of recognizing related collections within large sets of items by relying upon the statistical overlap of collections and textual analysis of metadata assigned to the collections. Other variations of how similarities between item collections within an item universe can be identified and used are discussed below.

Figure 2:
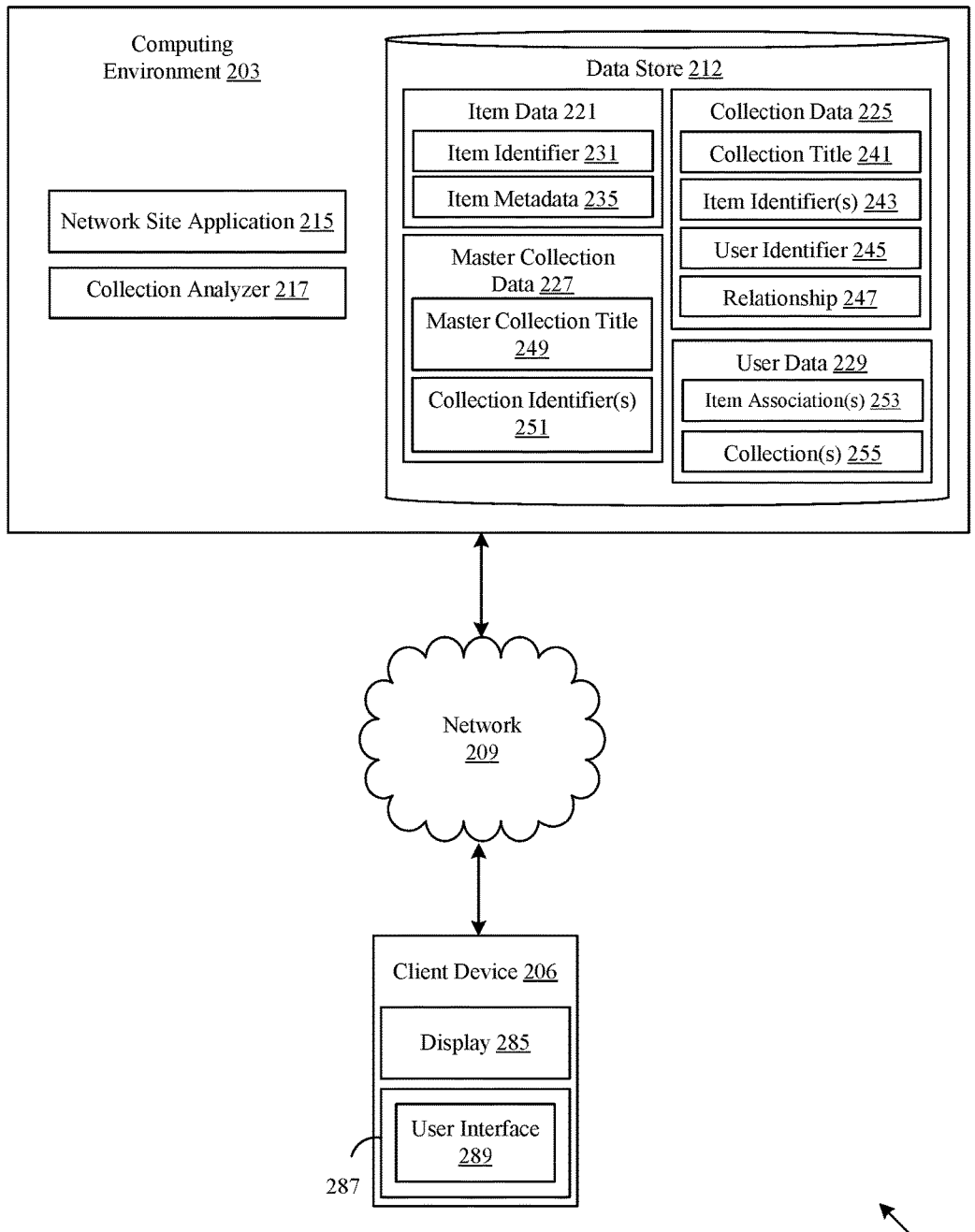
FIG. 2 is a drawing of a networked environment according to various embodiments of the disclosure.

With reference to FIG. 2, shown is a networked environment 200 according to various embodiments. The networked environment 200 includes a computing environment 203 and one or more client devices 206 in data communication via a network 209. The network 209 includes, for example, the Internet, intranets, extranets, wide area networks (WANs), local area networks (LANs), wired networks, wireless networks, or other suitable networks, etc., cable networks, satellite networks, or any combination of two or more such networks.

The computing environment 203 can comprise, for example, a server computer or any other system providing computing capability. Alternatively, the computing environment 203 can employ a plurality of computing devices that can be arranged, for example, in one or more server banks, computer banks, or other arrangements. Such computing devices can be located in a single installation or may be distributed among many different geographical locations. For example, the computing environment 203 can include a plurality of computing devices that together can comprise a hosted computing resource, a grid computing resource, and/or any other distributed computing arrangement. In some cases, the computing environment 203 can correspond to an elastic computing resource where the allotted capacity of processing, network, storage, or other computing-related resources may vary over time.

Various applications and/or other functionality can be executed in the computing environment 203. Also, various data is stored in a data store 212 that is accessible to the computing environment 203. The data store 212 can be representative of a plurality of data stores 212. The data stored in the data store 212, for example, is associated with the operation of the various applications and/or functional entities described below.

The components executed on the computing environment 203, for example, include a network site application 215, a collection analyzer 217, and other applications, services, processes, systems, engines, or functionality not discussed in detail herein. The network site application 215 is executed to serve requests from client devices 206 for content. The network site application 215 can retrieve or generate content pages that can transmitted to a client device 206 over the network 209. In one embodiment, the network site application 215 can generate content pages for an electronic marketplace, a search engine, or any other type of site in which content is generated based upon information about items in an item universe.

The collection analyzer 217 is executed to analyze items within an item universe and identify relationships between collections of items that are curated by various users within the item universe. Relationships between collections of items can be identified based upon a degree of overlap between items within the collections and a similarity between metadata associated with the items or the collections of items, such as a title, tag, or other metadata.

The data stored in the data store 212 includes, for example, item data 221, collection data 225, master collection data 227, user data 229 and other data that is not depicted that facilitates functioning of the network site application 215 and/or collection analyzer 217. Item data 221 includes information about items in an item universe, such as search results, photos, media, applications, a product catalog, or any other corpus of items. Items can be digital representations of products that are sold and shipped to customers or digital items that are provided to users over the network 209. Items can also represent music, movies, television programs, or any other data that can be associated with metadata.

Collection data 225 includes information about curated collections of items from the item universe. Collections can be created and curated by users, such as sellers in a multi-seller electronic marketplace, publishers within a publishing platform, artists or curators within a music platform, or any other users. Collections can identify items from the item data 221 by an identifier that uniquely identifies the items within the item universe. A collection can include, for example, a particular catalog of items curated and/or offered by a seller, artist, publisher or other type of user. A particular user can also be associated with multiple collections that the user creates and/or curates.

Master collection data 227 represents information about master collections that are created by the collection analyzer 217. A master collection represents an aggregation of multiple collections that have an identical or nearly identical title. A master collection can, in effect, represent a virtual collection in that it is not curated by a single user but instead represents an aggregation of collections that are separately curated by multiple users.

User data 229 includes information about users of a site facilitated by the computing environment 203. Users can represent sellers in a multi-seller electronic commerce platform, publishers in a publishing platform, artists in a music platform, etc. Users or representatives of a user can curate collections of items from the item universe, which the collection analyzer 217 can analyze to determine similarities or linkages between the collections to facilitate user or customer discovery of the curated collections.

Within item data 221 that is associated with items in an item universe, each item can be associated with an item identifier 231 that uniquely identifies the item with respect to other items. An item identifier 231 can include an ISBN, SKU, a globally unique identifier (GUID), or any other identifier with which an item can be identified within an item universe. Item metadata 235 can include other data associated with an item, such as text, images, video, pricing information, or other data fields that might be necessary or helpful to display information about an item in a user interface, ship or sell an item to a buyer, or process transactions for the item.

Within the collection data 225, each collection can be associated with a collection title 241, item identifiers 243, a user identifier 245, and one or more relationships 247. In some examples, a collection can also be associated with other metadata, such as an identifier, additional tags, or any other metadata. A collection title 241 is a title or tag assigned to the collection by a user with which a collection might be identified. In some examples, a collection might be associated with other metadata that the collection analyzer 217 can use to identify relationships with other collections. A collection can include one or more item identifiers 243 that identify the various items that a user can insert or curate into a collection. In this sense, a collection can include a list or catalog of items from the item universe. Accordingly, the item identifier 243 in the collection can be the same item identifier 231 with which the item is uniquely associated in the item data 221 or any other identifier with which the item can be located or identified.

A collection can also be associated with one or more relationships 247, which identify other collections with which the collection is related. A relationship 247 can identify other collections by an identifier that uniquely identifies collections within the item universe. The relationships 247 can be created within the data store 212 by the collection analyzer 217, which identifies similar collections within the item universe by analyzing the items within the collection, the collection title 241, and other metadata.

Within the master collection data 227, each master collection can be associated with a master collection title 249 that identifies the title of that master collection. As noted above, a master collection can include an aggregation of multiple collections of items within the item universe. In one embodiment, a master collection can be an aggregation of collections with an identical or nearly identical collection title 241. To this end, the master collection data 227 can also include one or more collection identifier 251 that identifies the respective collections that are aggregated into a master collection. In some examples, the master collection data 227 can include item identifiers 243 of the items within the collections rather than a reference to the collection.

Within user data 229, each user, or curator of collections, can be associated with one or more item association 253 and one or more collections 255. A user can also be associated with other metadata, such as a user name, display name, contact information, authentication data, or other user data 229. An item association 253 identifies an item within the item universe with which a user is linked. For example, an item association 253 can identify a particular item published by a user or otherwise offered within a network site by the user. Collections 255 can identify one or more collections that are curated by the user.

The client device 206 is representative of a plurality of client devices 206 that can be coupled to the network 209. The client device 206 can include, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 206 may include a display 285. The display 285 may include, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 can also execute a client application 287 that can render a user interface 289 on the display 285. For example, the client application 287 can be executed in a client device 206, for example, to access network content served up by the computing environment 203, thereby rendering a user interface 289 in which information about items and bundles of two or more items can be embedded. To this end, the client application can include, for example, a browser or a special-purpose application, and the user interface 289 can include a network page, an application screen, etc. The client device 206 can also execute applications beyond the client application 287.

Next, additional discussion follows for how relationships between collections within the item universe can be identified by the collection analyzer 217 and displayed to a user within a user interface 289. To begin, the collection analyzer 217 can periodically or constantly process or analyze collections within an item universe to analyze similarities or linkages between collections. In one example, the collection analyzer 217 can analyze a particular collection's relationship with other collections in the item universe each time the collection is updated or edited by a curator. In another example, the collection analyzer 217 can analyze the collection's relationships on a periodic basis and not each time the collection is edited.

The first way that a similarity between collections can be identified is by identifying item overlap between collections that meets an overlap threshold. In one example, the collection analyzer 217 can identify overlap between collections based upon whether two collections contain a minimum or threshold number of common items. As another example, two collections can be identified as related if a minimum percentage of total items from the two collections overlap. In another scenario, two collections can be identified as related if a statistical or mathematical measure that identifies overlap, similarity or relationship between two sets of data, such as a Jaccard index, meets a certain overlap threshold. If two collections are identified as similar or related based upon item overlap between the collections, the collection analyzer 217 can generate a relationship 247 that relates to two collections to one another within the collection data 225 for each of the collections.

In one example, for a particular collection under analysis, the collection analyzer 217 can examine all other collections within the item universe and calculate a Jaccard index for each of the other collections that expresses a degree of overlap with the collection. If the degree of overlap meets a threshold, the two collections can be related together via a relationship 247 by the collection analyzer 217.

In some examples, the items within collections can be ranked. The collection analyzer 217 can then determine overlap between the collections by comparing the highest N ranked items within respective collections. For example, the items within collections can be ranked according to a customer rating of an item, a number of hits a particular item has received, a purchase volume of an item, how recently a particular item was added to a collection. These variables can also be weighted in terms of importance to the ranking of an item. In this way, analysis of collections can be made more efficient by removing a requirement to analyze each and every item within collections that might be extremely large. Collections can also be related together as similar if a threshold number of customers or users of a system indicate an interest in a first collections and a second collections.

The next way that a similarity or relationship between collections can be identified is through an analysis of the collection title 241. In one example, similarities between collection titles 241 can be identified by employing a fuzzy string matching algorithm within the item universe. For example, for each collection within the item universe, a fuzzy string matching algorithm can identify other collections with a similar title. In one scenario, a similar title can be one that includes a common word or common word stem. In another scenario, a similar title can be one that scores above a confidence score threshold according to a textual similarity algorithm. Upon identifying other collections having a similar collection title 241 according to a string similarity algorithm, the two collections can be related together via a relationship 247 generated by the collection analyzer 217.

In some scenarios, the collection analyzer 217 can translate the collection titles 241 of respective collections into a common language, such as English, before performing a textual similarity analysis on the respective collection titles 241. In this way, even though collection titles 241 may vary in language, similarities between collections can still be identified.

Collections can also be grouped together into master collections by the collection analyzer 217. In one example, collections curated by various users having an identical or nearly identical collection title 241 can be aggregated into a master collection. The master collection can then be browsed by other users or customers. An identical or nearly identical collection title 241 can be identified for each collection within the item universe by identifying those other collections having an identical title or nearly identical after stemming the respective words in the collection title 241 of each collection. By grouping collections together into master collections, users can browse the master collection and discover all items that various curators of collections have identified under a certain topic or collection title 241.

In some scenarios, the collection analyzer 217 can translate the collection titles 241 of respective collections into a common language, such as English, before performing an analysis to identify identically or nearly identically titled collections. In this way, even though collection titles 241 may vary in language, identically or nearly identically titled collections can still be identified.

Figure 3:
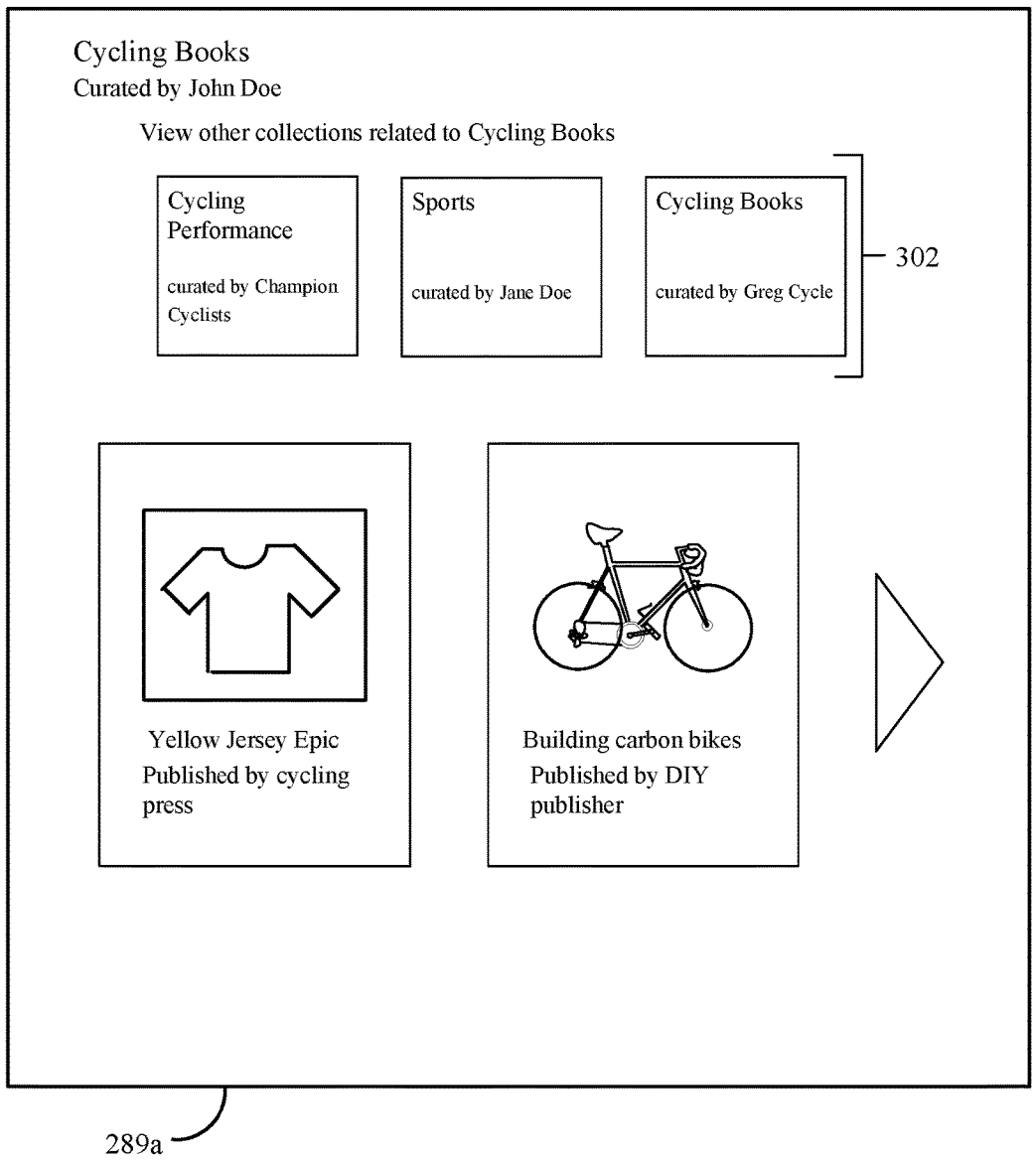
FIGS. 3-4 are drawings of user interfaces according to embodiments of the disclosure.

Accordingly, once the collections have be related together according to similarity and into master collections by the collection analyzer 217, the network site application 215 can generate user interfaces 289 that display information about collections of items within an item universe. Therefore, reference is now made to FIG. 3, which illustrates an example user interface 289a. In the example of FIG. 3, the network site application 215 can generate user interface 289a in response to a request from a client device 206 to browse a particular collection of items within the item universe that is curated by a particular user.

The user interface 289a can display at least a subset of the items from the item universe that are identified as being members of the collection. In some examples, the user interface 289a can allow a user to filter, sort, search within or otherwise manipulate the view of the particular collection. Additionally, the user interface 289a can include one or more reference to other collections within the user interface 289a, such as a hyperlink to another page that allows browsing of the collection. In the user interface 289a, the references to the other collections are shown in the header 302, but these references can be placed in any portion of the user interface 289a. The collections that are shown represent at least a subset of related collections identified by the collection analyzer 217 and identified by relationships 247 in the collection data 225 corresponding to the collection.

The related or similar collections can be those that are similar to the depicted collection in terms of item overlap, title similarity or those having an identical or nearly identical title. In some examples, the collections can be displayed and ranked according to a confidence score that gauges similarity between the collections. The respective references to the related collections can identify the user or curator that created the collection within the item universe. In this way, users who are browsing collections of items from an item universe can discover related collections of items that are curated by other users within the item universe. This discovery can lead to improved user engagement and potentially minimize user abandonment by allowing the user to locate other items and collections that might be related to their interests.

This user experience can offer a virtual experience that simulates a browsing experience in a physical environment in which items are organized by subject or topic. The user experience offered by embodiments of the disclosure is unique in electronic commerce environments in that it enables browsing activity to lead across subjects based upon similarities between collections that are curated by different sellers and that might also related to different subjects that overlap in some way, whether by title similarity or item overlap.

Figure 4:
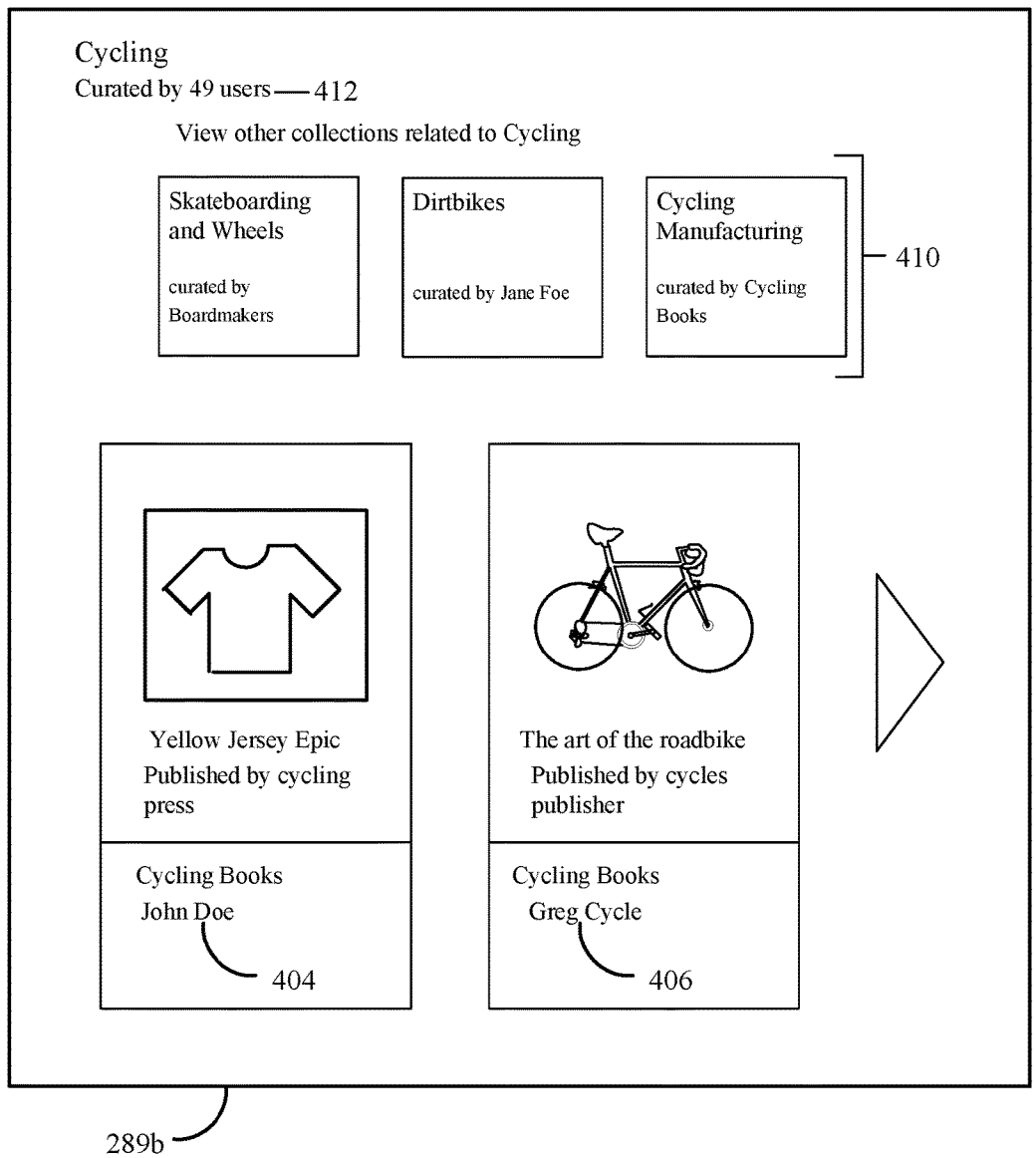

Referring next to FIG. 4, shown is an example of a user interface 289b that the network site application 215 can generate that includes information about a master collection within the item universe. The network site application 215, in one example, can allow the user to access information about master collections. In some examples, a user can enter a topic into a search engine, and the network site application 215 can identify master collections that match or are relevant to the search term.

Accordingly, the user interface 289b can include references to at least a subset of items that are within the master collection. In other words, the user interface 289b can identify items that are referenced by collections grouped together into a master collection. The network site application 215 can include at least a subset of those items in the user interface and allow the user to browse the master collection to view additional items in the collection. Additionally, in some examples, each of the items in the master collection can be displayed with a reference 404, 406 to a particular collection in which the item exists. In other words, the reference 404, 406 can identify a user curating the collection from which the item is drawn.

Additionally, the user interface 289b can also include references to other master collections that are related to the displayed collection or master collection. In the example of FIG. 4, the references to related collections are included in the header 410, but these references can be placed anywhere within the user interface 289b. In one scenario, the related master collections can be identified through textual similarity or item overlap in the same manner that similarity or relationships 247 between collections are identified by the collection analyzer 217. Additionally, the user interface 289b can also include a reference 412 to a number of users from which the items in the master collection are drawn. In other words, the network site application 215 or collection analyzer 217 can determine how many users curated the collections grouped together into a master collection and display a reference 412 to that information within the user interface 289b.

Figure 5:
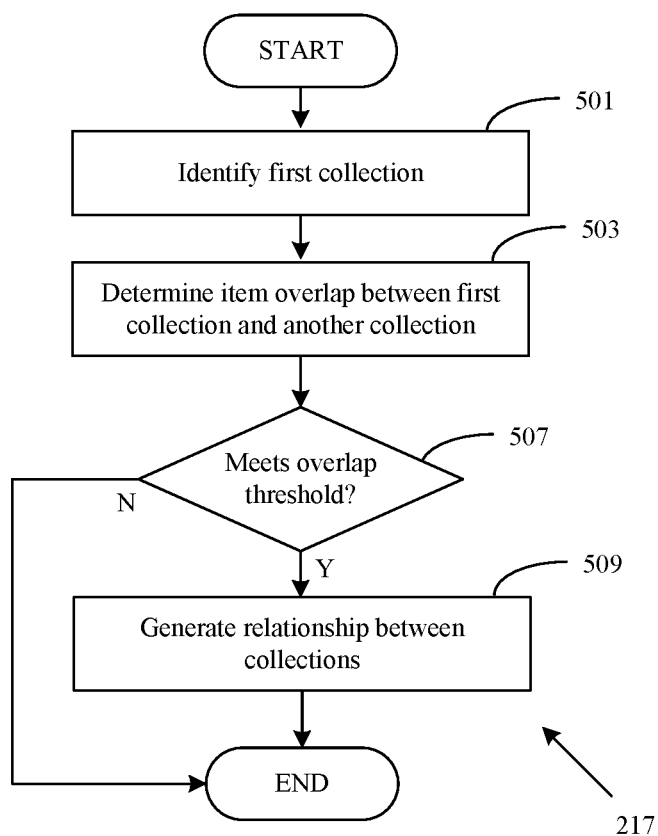
FIGS. 5-7 are flowcharts illustrating examples of functionality implemented as portions of a computing environment in the networked environment of FIG. 2 according to various embodiments of the present disclosure.

Referring next to FIG. 5, shown is a flowchart that provides one example of the operation of a portion of the collection analyzer 217 according to various embodiments. It is understood that the flowchart of FIG. 5 provides merely an example of the many different types of functional arrangements that may be employed to implement the operation of the portion of the collection analyzer 217 as described herein. As an alternative, the flowchart of FIG. 5 can be viewed as depicting an example of elements of a method implemented in the computing environment 203 according to one or more embodiments. FIG. 5 illustrates an example of how the collection analyzer 217 can generate relationships 247 between collections based upon item overlap.

Beginning with box 501, the collection analyzer 217 can identify a first collection that will be analyzed with respect to the other collections within the item universe. At box 503, the collection analyzer 217 can determine a degree of item overlap between the collection and another collection within the item universe. As noted above, the degree of overlap can be determined through a number of mathematical or statistical measures, such as a Jaccard index. At box 507, the collection analyzer 217 can determine whether the degree of overlap meets an overlap threshold. The overlap threshold can specify a degree of overlap that is necessary to consider the collections as related or similar. If not, the process proceeds to completion. If the degree of overlap meets the overlap threshold, the process, at box 509, can generate a relationship 247 for each of the two collections that relates the two collections together within the item universe. Thereafter, the process can proceed to completion.

The process depicted in FIG. 5 can be executed for a particular collection multiple times so that the collection is analyzed with respect to all other collections within the item universe. In other words, the collection analyzer can analyze the overlap of the first collection with respect to all other collections in the item universe. Additionally, the collection analyzer 217 can also analyze the overlap of other collections within the item universe with respect to other collections within the item universe. In other words, in one scenario, the collection analyzer 217 can calculate a Jaccard index of each collection with respect to every other collection within the item universe.

Figure 6:
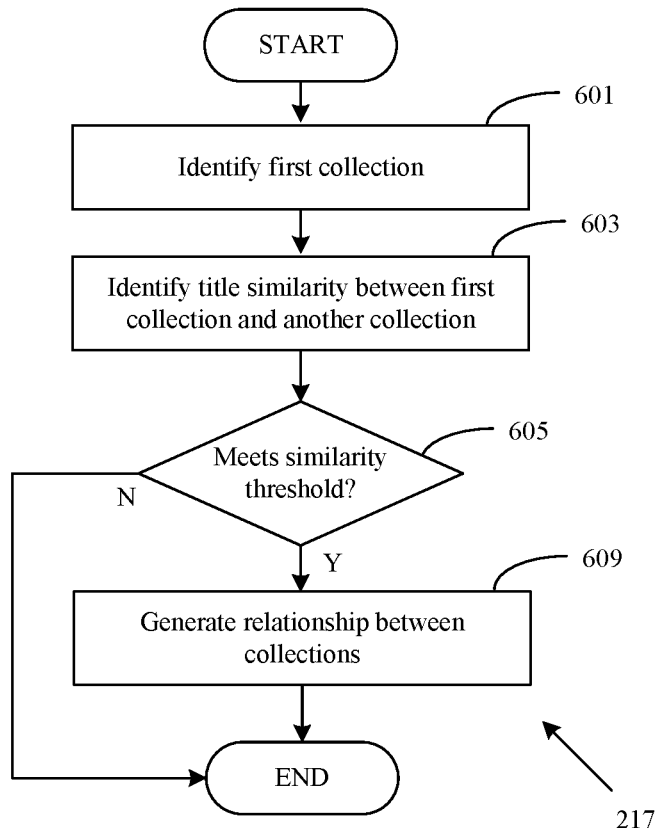

Referring next to FIG. 6, shown is a flowchart that provides one example of the operation of a portion of the collection analyzer 217 according to various embodiments. Referring next to FIG. 6, shown is a flowchart that provides one example of the operation of a portion of the collection analyzer 217 according to various embodiments. FIG. 5 illustrates an example of how the collection analyzer 217 can generate relationships 247 between collections based upon title similarity.

Beginning with box 601, the collection analyzer 217 can identify a first collection that will be analyzed with respect to the other collections within the item universe. At box 603, the collection analyzer 217 can identify similarity of a collection title 241 of the collection with respect to another collection title 241 of another collection in the item universe. At box 605, the collection analyzer 217 can determine whether the title similarity meets a similarity threshold. If not, the process can proceed to completion. The similarity threshold can be based on a score generated by a fuzzy string matching algorithm, which can represent a confidence or similarity score. The similarity threshold can also be based upon whether the respective collection titles 241 contain a common word or word stem. In the event that the collection titles 241 vary in language, the similarity can be determined after translation of the collection title 241 into a common language.

If the title similarity meets a similarity threshold, the process can proceed to box 609, where the collection analyzer 217 generates a relationship 247 for each collection that relates the two collections together within the item universe. Thereafter, the process proceeds to completion.

The process depicted in FIG. 6 can be executed for a particular collection multiple times so that the collection is analyzed with respect to all other collections within the item universe. In other words, the collection analyzer can analyze the title similarity of the first collection with respect to all other collections in the item universe. Additionally, the collection analyzer 217 can also analyze the title similarity of other collections within the item universe with respect to other collections within the item universe. In other words, in one scenario, the collection analyzer 217 can calculate a similarity score of the titles of each collection with respect to every other collection within the item universe.

Figure 7:
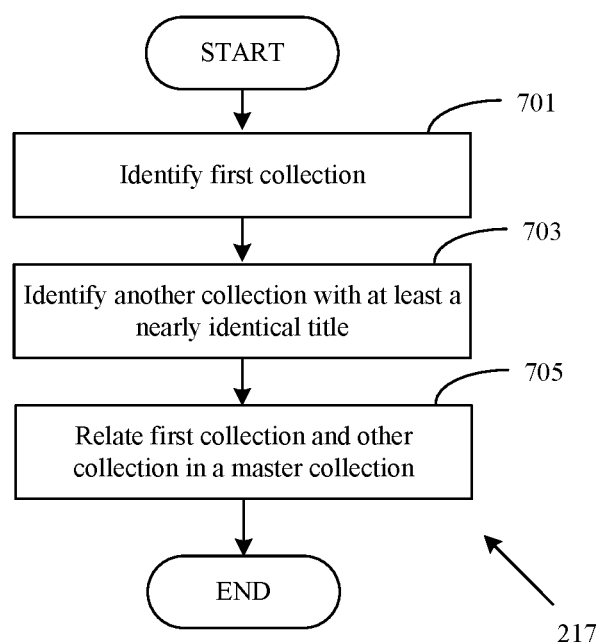

Referring next to FIG. 7, shown is a flowchart that provides one example of the operation of a portion of the collection analyzer 217 according to various embodiments. Referring next to FIG. 7, shown is a flowchart that provides one example of the operation of a portion of the collection analyzer 217 according to various embodiments. FIG. 5 illustrates an example of how the collection analyzer 217 can generate master collections that related collections together.

Beginning with box 701, the collection analyzer 217 can identify a first collection that will be analyzed with respect to the other collections within the item universe. At box 703, the collection analyzer 217 can identify another collection having a collection title 241 that is identical or nearly identical to the collection title 241 of the first collection. In some examples, the collection analyzer 217 can perform word stemming of the collection titles 241 before assessing whether two titles are identical or nearly identical. In some examples, the collection analyzer 217 can also ignore extraneous words from the collection title 241. At box 705, the two collections can be related to one another within the item universe. Thereafter, the process proceeds to completion.

The process depicted in FIG. 7 can be executed for a particular collection multiple times so that the collection is analyzed with respect to all other collections within the item universe. In other words, the collection analyzer can identify all collections having an identical or nearly identical title with respect to all other collections in the item universe. Additionally, the collection analyzer 217 can also analyze the collection title 241 of other collections within the item universe with respect to other collections within the item universe.

Figure 8:
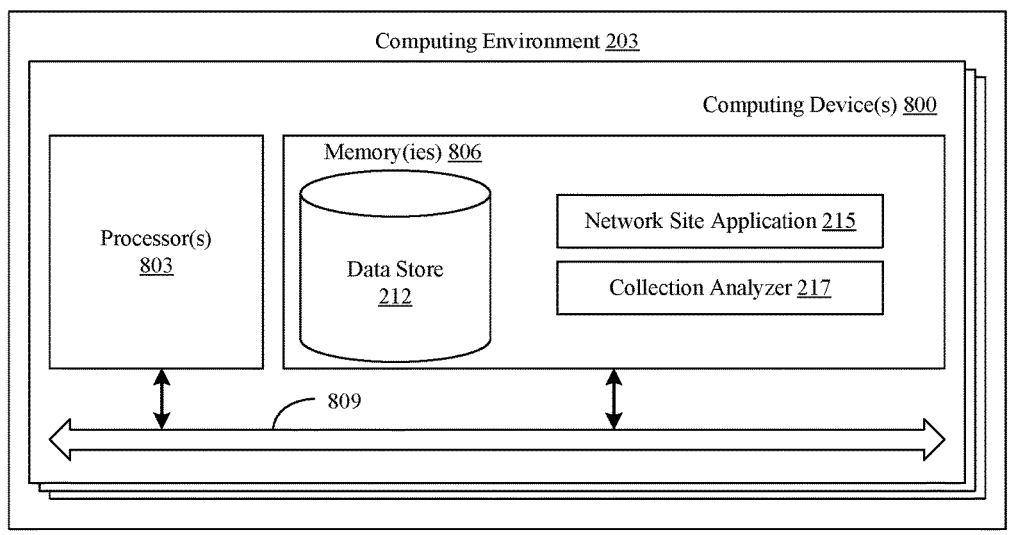
FIG. 8 is a schematic block diagram that provides one example illustration of a computing environment employed in the networked environment of FIG. 2 according to various embodiments of the present disclosure.

With reference to FIG. 8, shown is a schematic block diagram of the computing environment 203 according to an embodiment of the present disclosure. The computing environment 203 includes one or more computing devices 800.

Each computing device 800 includes at least one processor circuit, for example, having a processor 803 and a memory 806, both of which are coupled to a local interface 809. To this end, each computing device 800 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the network site application 215 the collection analyzer 217, and potentially other applications. Also stored in the memory 806 may be a data store 212 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the network site application 215, the collection analyzer 217, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5-7 shows the functionality and operation of an implementation of portions of the network site application 215 and the collection analyzer 217. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 5-7 shows a specific order of execution, it is understood that the order of execution may differ from that which is depicted. For example, the order of execution of two or more blocks may be scrambled relative to the order shown. Also, two or more blocks shown in succession in FIGS. 5-7 may be executed concurrently or with partial concurrence. Further, in some embodiments, one or more of the blocks shown in FIGS. 5-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network site application 215 and the collection analyzer 217, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the network site application 215 and the collection analyzer 217, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 800, or in multiple computing devices 800 in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
    traversing a plurality of collections in an item universe, wherein the collections identify items within an item universe;
    identifying a pair of collections having a threshold number of overlapping items between one another or a textually similar collection title to one another, wherein individual ones of the collections are respectively curated by different users of the item universe and textual similarity is determined based upon a fuzzy string matching algorithm that identifies strings as similar based upon a presence of a common word between the strings;
    relating the pair of collections to one another within the item universe;
    identifying at least one plurality of collections as having a nearly identical collection title wherein the nearly identical collection title is determined by stemming respective words in a respective collection title of the collections and identifying respective collection titles with identical collection titles after performing the stemming;
    relating the at least one plurality of collections having the nearly identical collection title into a respective master collection within the item universe;
    in response to receiving a request to generate a first user interface displaying a particular collection from the pairs of collections, generating the user interface displaying the particular collection, wherein a reference to at least one other collection to which the particular collection is related by the pairs of collections is included within the user interface displaying the particular collection; and
    in response to receiving a request to generate a second user interface displaying the respective master collection, generating the second user interface displaying at least a subset of items from the master collection, wherein a respective collection from which individual ones of the respective master collection is identified in the user interface.

2. The method of claim 1, wherein the textually similar collection title is identified by:
    translating respective collection titles of the plurality of collections into a common language; and
    determining whether the respective collection titles of the plurality of collections match one another according to a fuzzy string matching algorithm.

3. The method of claim 1, wherein the textually similar collection title is identified by identifying respective collection titles of the plurality of collections that are synonymous with one another.

4. The method of claim 1, wherein the textually similar collection title is identified by generating a Jaccard index for the plurality of collections in the item universe.

5. A method, comprising:
    identifying a number of overlapping items between a first collection and at least one other collection within an item universe, wherein the first collection is curated by a first user and the at least one other collection is curated by at least one other user;
    determining whether the number of overlapping items meets an overlap threshold, wherein the overlap threshold specifies a statistical similarity coefficient expressing a similarity of the first collection and the at least one other collection, wherein determining whether the number of overlapping items meets an overlap threshold comprises:
        calculating a Jaccard index of the first collection relative to respective ones of a plurality of collections within the item universe; and
        identifying respective ones of the plurality of collections having a Jaccard index that meets the overlap threshold;
    relating the first collection and the at least one other collection together within the item universe in response to determining that the number of overlapping items meets the overlap threshold;

obtaining a request to generate a user interface including at least a subset of items from the first collection; and generating a reference to the at least one other collection within the user interface when the number of overlapping items meets the overlap threshold.

6. The method of claim 5, further comprising:

identifying at least one other collection having a textually similar collection title relative to the first collection;

relating the at least one other collection having the textually similar collection title to the first collection within the item universe; and incorporating a reference to the at least one other collection having the textually similar collection title within the user interface.

7. The method of claim 6, wherein identifying the at least one other collection having a textually similar collection title is based at least in part upon a fuzzy string matching algorithm of a title of the first collection and a respective title of the at least one other collection.

8. The method of claim 6, wherein identifying the at least one other collection having a textually similar collection title further comprises identifying individual ones of a plurality of collections within the item universe having a minimum number of overlapping items with respect to the first collection.

9. The method of claim 5, further comprising:

identifying a plurality of collections having an identical collection title relative to the first collection within the item universe;

relating the plurality of collections having the identical collection title with the first collection; and obtaining a request to generate another user interface displaying items from within the item universe that are associated with the identical collection title; and generating the other user interface containing a reference to at least a subset of a plurality of items referenced by the plurality of collections and the first collection.

10. The method of claim 9, wherein the first collection and the plurality of collections are respectively curated by different users within the item universe, and the method further comprises:

including a reference to a respective user associated with respective ones of the at least a subset of the plurality of items referenced by the plurality of collections and the first collection.

11. The method of claim 5, wherein identifying the number of overlapping items between the first collection and the at least one other collection further comprises identifying a quantity of items in the first collection and the other collection having a common International Standard Book Number (ISBN).

12. The method of claim 5, wherein relating the first collection and the at least one other collection together within the item universe in response to determining that the number of overlapping items meets the overlap threshold comprises relating the first collection and the at least one other collection together into a master collection within the item universe.

13. The method of claim 12, further comprising incorporating a reference to the master collection within the user interface.

14. A system, comprising:

at least one computing device executing a collection analyzer, the collection analyzer causing the at least one computing device to at least:

identify a number of overlapping items between a first collection and at least one other collection within an item universe, wherein the first collection is curated by a first user and the at least one other collection is curated by at least one other user;

determine whether the number of overlapping items meets an overlap threshold, wherein the overlap threshold specifies a statistical similarity coefficient expressing a similarity of the first collection and the at least one other collection, wherein determining whether the number of overlapping items meets an overlap threshold comprises causing the at least one computing device to at least:

calculate a Jaccard index of the first collection relative to respective ones of a plurality of collections within the item universe; and identify respective ones of the plurality of collections having a Jaccard index that meets the overlap threshold;

relate the first collection and the at least one other collection together within the item universe in response to determining that the number of overlapping items meets the overlap threshold;

obtain a request to generate a user interface including at least a subset of items from the first collection; and generate a reference to the at least one other collection within the user interface when the number of overlapping items meets the overlap threshold.

15. The system of claim 14, wherein the collection analyzer further causes the at least one computing device to at least include a reference to a respective user associated with the at least one other collection.

16. The system of claim 14, wherein the collection analyzer further causes the at least one computing device to at least:

identify, within the item universe, a different plurality of collections having a collection title that is textually similar to at least one of the first collection or the at least one other collection; and generate a reference to at least one of the different plurality of collections within the user interface.

17. The system of claim 14, wherein the collection analyzer further causes the at least one computing device to at least:

identify another plurality of collections within the item universe having a degree of overlap that meets an overlap threshold;

relate the other plurality of collections together within the item universe;

obtain a request to generate a second user interface including at least a subset of items from one of the other plurality of collections; and generate a reference to at least one other collection from the other plurality of collections.

18. The system of claim 17, wherein the collection analyzer further causes the at least one computing device to at least:

identify, within the item universe, another plurality of collections having a textually similar collection title; and relate the other plurality of collections together within the item universe, wherein the reference to the at least one other collection from the subset of the plurality of collections includes a reference to at least one of the other plurality of collections.

19. The system of claim 17, wherein the overlapping items are identified based upon having a common International Standard Book Number (ISBN).

20. The system of claim 17, wherein the overlapping items are identified based upon having a common listing identifier.

\* \* \* \* \*